United States Patent [19]
Blanchard et al.

[11] Patent Number: 6,141,548
[45] Date of Patent: Oct. 31, 2000

[54] METHOD AND APPARATUS FOR LOCATION BASED INTERCEPT IN A COMMUNICATIONS SYSTEM

[75] Inventors: Scott David Blanchard, Mesa; Dean Paul Vanden Heuvel, Chandler; Pramodkumar Patel, Phoenix, all of Ariz.

[73] Assignee: Motorola, Inc., Schaumburg, Ill.

[21] Appl. No.: 09/016,942

[22] Filed: Feb. 2, 1998

[51] Int. Cl.[7] ........................................ H04Q 7/20
[52] U.S. Cl. .................... 455/428; 455/12.1; 455/456
[58] Field of Search .................... 455/427, 428, 455/429, 456, 457, 432, 433, 436, 458, 445, 12.1; 342/372, 387, 457, 458

[56] References Cited

U.S. PATENT DOCUMENTS

| | | | |
|---|---|---|---|
| Re. 35,916 | 10/1998 | Dennison et al. | 455/456 |
| 5,058,201 | 10/1991 | Ishii et al. | 455/456 |
| 5,223,844 | 6/1993 | Mansell et al. | 455/456 |
| 5,303,297 | 4/1994 | Hillis | 455/456 |
| 5,390,234 | 2/1995 | Bar-Noy et al. | 455/456 |
| 5,412,389 | 5/1995 | Olds | 342/357 |
| 5,500,648 | 3/1996 | Maine et al. | 342/357 |
| 5,548,801 | 8/1996 | Araki et al. | 455/456 |
| 5,596,624 | 1/1997 | Armbruster | 379/58 |
| 5,727,057 | 3/1998 | Emery et al. | 455/456 |
| 5,734,981 | 3/1998 | Kennedy, II et al. | 455/456 |
| 5,943,621 | 8/1999 | Ho et al. | 455/456 |

*Primary Examiner*—Nay Maung
*Attorney, Agent, or Firm*—Dana B. LeMoine; Frank J. Bogacz

[57] ABSTRACT

A method and apparatus for providing location-based intercept in a system includes an intercept monitoring unit (210) for dynamically modifying an intercept target list (245) in a communications switch (240). The intercept monitoring unit (210) determines, as a function of user location, whether the user's call should be intercepted. If so, either an updated entry is made to the intercept target list (245), or an entire updated copy of the intercept target list (237) is downloaded to the communications switch (240).

15 Claims, 2 Drawing Sheets

METHOD AND APPARATUS FOR LOCATION BASED INTERCEPT IN A COMMUNICATIONS SYSTEM

FIELD OF THE INVENTION

This invention relates in general to the monitoring of users in communications systems and, in particular, to the dynamic modification of intercept lists in support of location-based intercept.

BACKGROUND OF THE INVENTION

Many communications systems have the ability to provide intercept services. Intercept services are services for intercepting calls and providing an eavesdropping capability. These services are typically used by law enforcement agencies (LEA) within their jurisdictions.

When a particular telephone line in a wireline telephony system is to be targeted for intercept, an indication of the line number is included in a list of numbers to be monitored. Similarly, within existing mobile telephony systems, a user number or telephone number is specified for intercept, and included with all such numbers. In prior art telephony systems, either wireline or mobile, intercept target lists are created and maintained manually in a controlled environment, and are subsequently loaded into the network switches. The intercept target lists typically include information describing the user to be monitored and the monitoring agency to which the monitored traffic should be delivered. When a call is placed through a network switch which has been loaded with an intercept target list, or when another appropriate event within the call process occurs, the switch queries the intercept target list to determine if any list member is involved in the call. If a user involved in the call is found in the list, the switch invokes a monitoring function which forwards the call to the appropriate monitoring agency. This prior art method of determining whether to intercept a call is herein identified as user-based intercept. In user-based intercept, the decision whether or not to intercept any call is based on the identity of either the calling party or the called party.

The party identity is typically given by what is referred to as the telephone number. This existing monitoring capability limits the intercept functionality such that it is only the telephone number which is used to perform the intercept determination.

A growing number of monitoring agencies desire to make call monitoring decisions based on criteria other than the identity of users or their associated telephone numbers. For example, sovereign entities may want to monitor all calls that emanate from, or terminate in, a certain location area or region. This type of intercept decision based on location is herein referred to as location-based intercept. Unfortunately, prior art switches supporting user-based intercept do not provide for location-based intercept. In order to provide intercept of all calls in any given area using existing switches and their associated intercept target lists, it would be necessary to include all users in the area in the intercept target list. This is not feasible because intercept target lists in switches are of a fixed size and cannot accommodate enough entries.

In order to accommodate intercept based on criteria other than user identities, new switches could be designed or current switches could be modified; however, this would be a very expensive solution to the problem. There is a large installed base of existing switches in communications systems today, and the cost of upgrading or replacing them all just to modify the intercept decision would be prohibitive. It would be desirable for existing switches to accommodate location-based intercept.

What is needed is a method and apparatus for providing location-based intercept with switches already having user-based intercept capability.

DETAILED DESCRIPTION OF THE DRAWINGS

Figure 1:
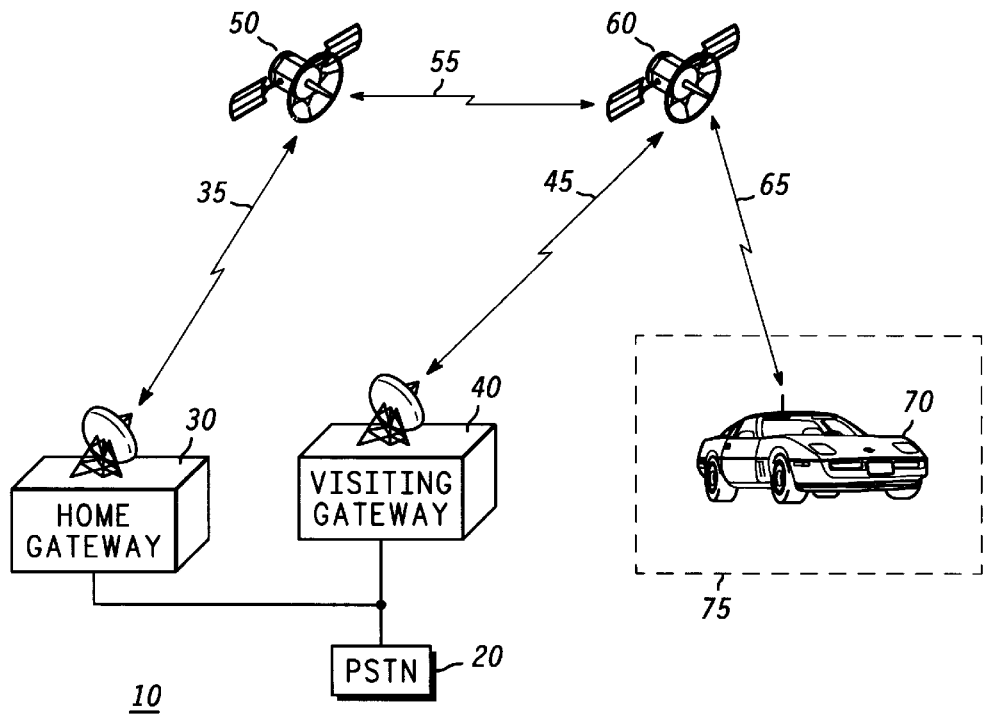
FIG. 1 shows a diagram of a satellite communications system in accordance with a preferred embodiment of the present invention.

Turning now to the drawings in which like reference characters indicate corresponding elements throughout the several views, attention is first directed to FIG. 1. FIG. 1 shows a diagram of a satellite communications system in accordance with a preferred embodiment of the present invention.

Satellite communications system 10 includes satellite 50, satellite 60, home gateway (HGW) 30, visiting gateway (VGW) 40, and public switched telephone network (PSTN) 20. Also shown in satellite communications system 10 are communications links 35, 45, 55, and 65, and user 70 within location area 75.

Satellites 50 and 60 are preferably low earth orbit (LEO) satellites, but this is not a limitation of the present invention. In a preferred embodiment, satellites 50 and 60 are part of a larger constellation of LEO satellites. In addition, the functionality of satellites 50 and 60 can be combined into a single satellite while still practicing the present invention. For example, communications system 10 could include one or more geostationary (GEO) satellites that provide the functionality of satellites 50 and 60.

HGW 30 and VGW 40 communicate with satellites 50 and 60 via communication links 35 and 45 as shown in FIG. 1. The satellites, in turn, communicate with mobile user 70 via communication link 65. The communication links in the exemplary embodiment of FIG. 1 show a single gateway communicating with a single satellite and a single satellite communicating with a single mobile user. In a preferred embodiment, HGW 30 and VGW 40 each communicate with multiple satellites, possibly simultaneously, and each satellite communicates with multiple mobile users. FIG. 1 shows that for mobile user 70 to communicate with HGW 30, the communication link includes two satellites. In another valid configuration of the network, the link between mobile user 70 and HGW 30 includes three or more satellites, and in still another valid configuration, only one satellite is needed.

One of many functions performed by HGW 30 and VGW 40 is to network the satellite communications system with PSTN 20. When a call is placed by mobile user 70, the call is routed through the satellite network to a gateway, and if the call is destined for a user in PSTN 20, the gateway routes the call to PSTN 20. If, on the other hand, the call is destined for another user within satellite communications system 10, the call may never be routed to PSTN 20. HGW 30 and VGW 40 can communicate using terrestrial links or using satellite communication links such as the path created by links 35, 45, and 55.

Location area 75 represents a geographical region on the surface of the earth. The shape of location area 75 is not important to the present invention. Satellite communications system 10 maintains information describing many location areas, possibly numbering in the millions. For exemplary purposes, only one such location area is shown in FIG. 1 as location area 75. Likewise, for exemplary purposes FIG. 1 shows a single mobile user, but communications system 10 preferably tracks many mobile users. Additionally, many mobile users can be within a single location area. An apparatus and method for tracking the location area of users is described in U.S. Pat. Nos. 5,412,389 and 5,500,648, issued May 2, 1995 and Mar. 19, 1996 respectively, the subject matter of which is hereby incorporated by reference.

An area that a monitoring agency wishes to monitor is termed a target intercept area. The target intercept area is related to location area 75 in that location area 75 is preferably smaller than the target intercept area. In a preferred embodiment, location area 75 is substantially smaller than the size of the target intercept area such that many location areas 75 fit within the target intercept area; however, in an alternate embodiment, location area 75 comprises the entire intercept area.

Location areas defined by satellite communications system 10 can be as small as allowed by the resolution of the system, or can be larger if high resolution is not needed. For example, if location-based intercept is provided for a sovereign nation so that all calls into or out of the country are to be intercepted, location determination can be somewhat coarse, at least in the interior of the country. The system can define location areas to be larger and still satisfy the requirements of the monitoring agency (in this case, a sovereign government).

Each mobile user is assigned a home gateway. One purpose of the home gateway is to track the location area of the mobile user and to provide billing services. Potentially, any gateway within satellite communications system 10 can function as a home gateway. In the exemplary embodiment shown in FIG. 1, mobile user 70 has home gateway HGW 30. When mobile user 70 is in the proximity of HGW 30 such that the routing of a communications signal to HGW 30 is more efficient than routing to any other gateway, then HGW 30 is the only gateway necessary for routing the communications signal. This corresponds to location area 75 being physically proximate to HGW 30. In contrast, if location area 75 is not physically proximate to HGW 30, such that a more efficient routing path is through a different gateway, such as VGW 40, then a communications signal from mobile user 70 will be routed through VGW 40 instead of HGW 30.

When mobile user 70 is accessing satellite communications system 10, HGW 30 determines the user's location area, and also determines which gateway will serve as a visiting gateway for the call. In the exemplary embodiment of FIG. 1 where the home gateway and the visiting gateway are different physical gateways, HGW 30 determines the location area 75 of mobile user 70 to be physically proximate to VGW 40. HGW 30 then sends a message to VGW 40 announcing that VGW 40 is to handle the call. This message is termed a visiting gateway assignment (VGA). The VGA preferably includes information identifying location area 75. In this way, VGW 40 handles the call from mobile user 70 and also has information describing location area 75 that corresponds to the physical location of mobile user 70.

It should be noted that in a preferred embodiment, calls are always handled by a visiting gateway, and for every call the home gateway sends a VGA. If mobile user 70 is physically proximate to his home gateway, the home gateway and the visiting gateway will be the same physical gateway. In this sense, the visiting gateway designation can be viewed as virtual. The virtual visiting gateway is assigned to a physical gateway, which can be the home gateway or any other gateway. The generation of VGA messages and the assignment of virtual gateways is described in U.S. Pat. No. 5,596,624, issued Jan. 21, 1997, the subject matter of which is hereby incorporated by reference.

In a preferred embodiment of the present invention, VGW 40 can perform an intercept decision based on, among other things, location area 75. When location area 75 is within a target intercept area, VGW 40 will route calls emanating from, or terminating in, location area 75 to the appropriate monitoring agencies. The routing of the intercepted call can be made through communication link 45, or PSTN 20. The apparatus and method for location-based intercept by VGW 40 is described in more detail below.

Figure 2:
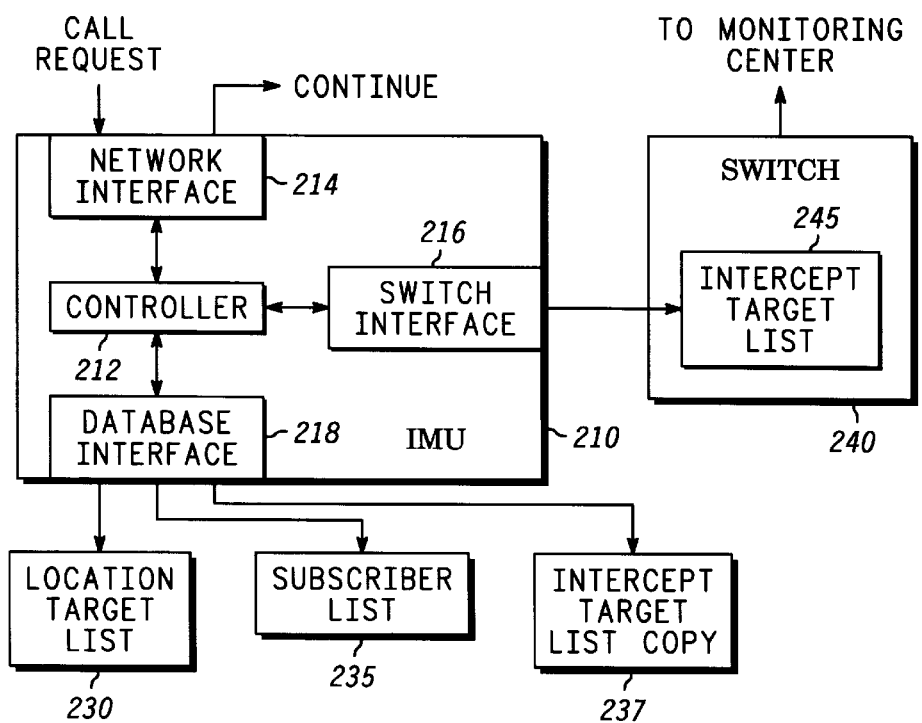
FIG. 2 shows a diagram of a portion of a satellite communications system in accordance with a preferred embodiment of the present invention.

FIG. 2 shows a diagram of a portion of a satellite communications system in accordance with a preferred embodiment of the present invention. All or part of the functionality depicted in FIG. 2 can be included within VGW 40 (FIG. 1). FIG. 2 shows intercept monitoring unit (IMU) 210, location target list 230, subscriber list 235, intercept target list copy 237, and switch 240.

Switch 240 includes intercept target list 245. As previously stated, intercept target list 245 commonly includes fields describing users to be monitored, and monitoring agencies associated therewith. When a monitoring agency desires to intercept calls from specific users, intercept target list 245 is modified to include the target user's identity, and the identity of the monitoring agency. The switch queries the list when routing a call to see if a particular user is to be monitored. If so, the switch routes a copy of the call to the monitoring agency. In this way, user-based intercept is accommodated.

In existing switch technology, intercept lists such as intercept target list 245 are of a limited, fixed size. This limits the total number of users to be intercepted by a single switch at any given time. The fixed size of intercept target list 245 can be a reasonable limitation when performing user-based intercept; however, the fixed size of intercept target list 245 becomes an impractical limitation when performing location-based intercept. Location-based intercept using intercept target list 245 without modification would require that all users in, or believed to be in, the target intercept area be identified in intercept target list 245. In existing switch technology, when the number of users in the intercept target area exceeds the capacity of intercept target list 245, only a subset of the targeted users in the intercept target area can be monitored.

IMU 210 provides a needed method and apparatus for utilizing switch 240 and intercept target list 245 for location-based intercept. IMU 210 includes network interface 214, switch interface 216, database interface 218, and controller 212. IMU 210 is preferably located within VGW 40 (FIG. 1). When VGW 40 (FIG. 1) receives a VGA, IMU 210 analyzes the location area of the user relative to target intercept areas and then in near real time, modifies intercept target list 245 to include the user identity associated with the VGA. Then when switch 240 receives the call it will find the user identity in intercept target list 245, and forward the call to the appropriate monitoring agency, thereby effecting location-based intercept.

When VGW 40 (FIG. 1) receives a VGA, IMU 210 receives a call request at network interface 214. The call request received at network interface 214 can be an exact copy of the VGA received, or can simply be the location area information of the mobile user. Controller 212 receives location area information from network interface 214, and queries databases via database interface 218. Location target list 230 is preferably a database including location areas such as location area 75 (FIG. 1) within which users are to be monitored. When controller 212 determines that the location area received from network interface 214 is included in location target list 230, controller 212 modifies intercept target list 245 via switch interface 216.

Location target list 230 preferably includes fields describing location areas and monitoring agencies. Subscriber list 235 preferably includes user information in a format compatible with intercept target list 245. Subscriber list 235 may correspond to the home location register (HLR) well known in the art of Global System for Mobile communications (GSM).

IMU 210 can update intercept target list 245 one entry at a time, or can update the entire contents at once. If the entire contents are to be updated at once, IMU 210 updates intercept target list copy 237 and then downloads intercept target list copy 237 to switch 240 as a replacement for intercept target list 245. Switch interface 216 can be modified so that IMU 210 can be utilized with different types of switches. This allows IMU 210 to provide location-based intercept in communications systems which employ different types of switches.

In operation, when a call request comes in, a finite amount of time is required by IMU 210 to update intercept target list 245. Although the operation is fast, and preferably in near real time such that a user will not notice any delay, a finite amount of time is required to update intercept target list 245 prior to the routing of the call. As a result, VGW 40 (FIG. 1) preferably delays the routing of the call until IMU 210 completes the update of intercept target list 245. This can be accomplished many different ways. One example is shown as a continue signal output from network interface 214. In a preferred embodiment, the continue signal notifies VGW 40 (FIG. 1) that IMU 210 has completed the update of intercept target list 245. VGW 40 (FIG. 1) delays the routing of the call until receiving the continue signal from IMU 210. In an alternate embodiment, VGW 40 employs a fixed time delay prior to routing the call. The fixed time delay is calculated such that IMU 210 completes the update of intercept target list 245 prior to the routing of the call.

A call request can be received by IMU 210 for either a calling party or a called party. If the visiting gateway is handling a calling party making a call, then the location area included in the call request received by network interface 214 corresponds to the location area of the calling party. If, on the other hand, the visiting gateway is handling the call for the called party, the call request received by network interface includes location information which specifies the location area of the called party. It can be seen then, that IMU 210 can function to provide location-based intercept service for either calling parties or called parties.

Figure 3:
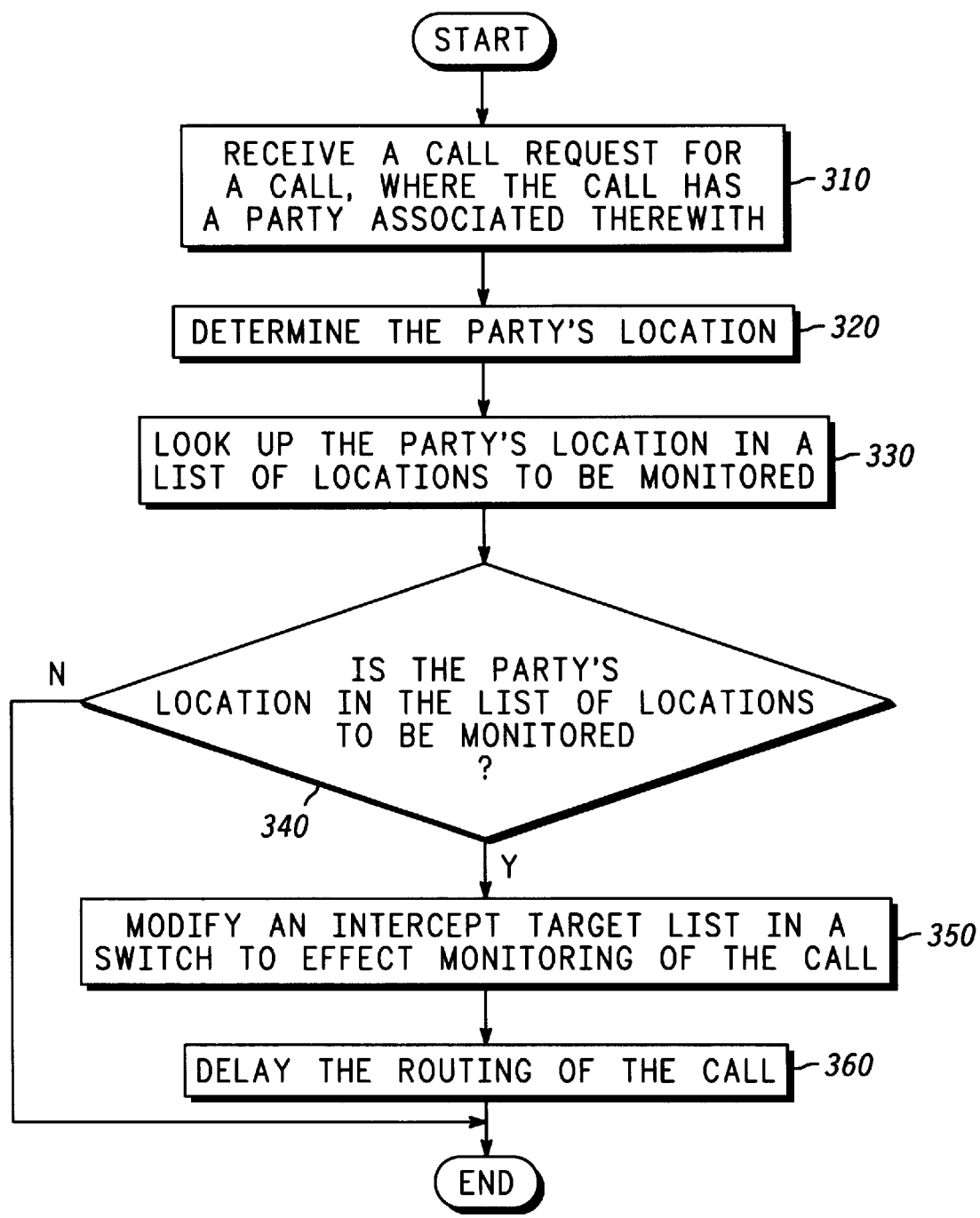
FIG. 3 shows a flow chart for a method of modifying an intercept list in accordance with a preferred embodiment of the present invention.

FIG. 3 shows a flow chart for a method of modifying an intercept list in accordance with a preferred embodiment of the present invention. Method 300 is a method for modifying a target intercept list in support of location-based intercept. Method 300 is preferably performed by an intercept monitoring unit such as IMU 210 (FIG. 2), however method 300 can also be performed by a gateway, a switch, or other suitable means.

Method 300 begins with step 310 when a call request for a call is received, where the call has a party associated therewith. The party associated with the call request of step 310 can be a calling party or a called party. If a gateway is handling the routing for a calling party, then the party of step 310 is a calling party. In contrast, if a gateway is handling the routing for a called party, then the party associated with step 310 is the called party. The location of the party of step 310 is determined in step 320. In the exemplary embodiment of FIG. 2, the party's location is included in the call request. In an embodiment where a home gateway and a visiting gateway are the same physical gateway, step 320 is performed when the home gateway physically determines the party's location.

After the party's location is known, the party's location is looked up in a list of locations to be monitored in step 330. After looking up the party's location in step 330, a determination is made in step 340 whether the party's location is a location to be monitored. If the party's location is not a location to be monitored, then processing is complete. If, on the other hand, the party's location is in the list of locations to be monitored, then processing proceeds with step 350. In step 350, an intercept target list in a switch is modified to effect the monitoring of the call. This can be performed by updating a complete target intercept list in a switch, or can be performed by updating a single entry in a target intercept list.

Step 360 delays the routing of the call so that the target intercept list can be modified prior to the routing of the call. One skilled in the art will appreciate that step 360 is a step that can be performed anywhere in the sequence of steps in method 300. The delay of step 360 can be accomplished by a fixed delay or by a feedback signal to a gateway which indicates completion of modification of a target intercept list in a switch.

In summary, the method and apparatus of the present invention provides an advantageous means for utilizing existing switch technology in a system providing location-based intercept. While we have shown and described specific embodiments of the present invention, further modifications and improvements will occur to those skilled in the art. For example, the specific embodiments described pertain mainly to telephony systems, but the method and apparatus of the present invention also apply to wideband systems, paging systems, and other data delivery services. Also for example, embodiments of the present invention have been described with respect to location-based intercept, but the method and apparatus of the present invention are also applicable to intercept based on other criteria such as type of call (data or voice), or mobile systems integrated services digital network (MSISDN) number. We desire it to be understood, therefore, that this invention is not limited to the particular forms shown and we intend in the appended claims to cover all modifications that do not depart from the spirit and scope of this invention.

What is claimed is:

1. A method of handling a call request in a communications system, said method comprising the steps of:

receiving said call request for a call, said call having a party associated therewith;

determining a location area of the party;

looking up said party's location area in a list of locations to be monitored; and if the party's location is in a list of locations to be monitored:

updating a target intercept list in a communications switch; and modifying said target intercept list to include said party's user ID to monitor the party's call.

2. The method of claim 1 further comprising the step of delaying the routing of said call.

3. The method of claim 2 wherein the routing of said call is delayed for a fixed period of time.

4. The method of claim 2 wherein the routing of said call is delayed until said step of updating said target intercept list is complete.

5. The method of claim 1 wherein said party is a calling party.

6. The method of claim 1 wherein said party is a called party.

7. The method of claim 1 wherein said step of determining a location area comprises querying information included in said call request.

8. The method of claim 1 wherein said step of updating said target intercept list comprises the steps of:

maintaining a copy of said target intercept list;

modifying said copy of said target intercept list; and sending said copy of said target intercept list to said communications switch.

9. The method of claim 1 wherein said step of updating said target intercept list comprises the steps of:

generating a target intercept list record for said party; and sending said target intercept list record to said communications switch.

10. An apparatus for location-based intercept of communications, said apparatus comprising:

means for communicating with a communications network;

means for determining a location area of a caller;

means for looking up the caller's location area in a list of locations to be monitored;

means for generating intercept information;

if the caller's location area is in the list of locations to be monitored:

means for sending said intercept information to a communication switch;

means for updating a target intercept list to monitor the caller's call, said means for updating coupled to said means for generating intercept information and operating in response to said means for generating intercept information; and modifying the target intercept list to include the caller's user ID.

11. The apparatus of claim 10 wherein said means for communicating with a communications network comprises a network interface input for accepting call requests from said communications network.

12. The apparatus of claim 11 wherein said means for communicating with a communications network further comprises a network interface output for notifying said communications network when to complete a call request.

13. The apparatus of claim 10 wherein said means for determining the location area of a caller comprises a controller capable of querying a call request received by said apparatus.

14. The apparatus of claim 10 wherein said means for generating intercept information comprises:

a database interface for accessing a location target list database; and a controller for querying said location target list database, and for generating said intercept information.

15. The apparatus of claim 10 wherein said means for generating intercept information comprises:

data storage means for maintaining a copy of an intercept list; and a controller for modifying entries in said copy of said intercept list, to produce said intercept information.

* * * * *